(12) United States Patent
Jackson

(10) Patent No.: US 6,557,058 B1
(45) Date of Patent: Apr. 29, 2003

(54) METHOD AND APPARATUS OF SUSTAINED SEQUENTIAL DATA TRANSFER IN A MEDIA DRIVE

(75) Inventor: Robert Jackson, Union City, CA (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/452,605

(22) Filed: Dec. 1, 1999

(51) Int. Cl.$^7$ .............................................. G06F 13/00
(52) U.S. Cl. ............................ 710/60; 710/10; 710/52; 710/33; 711/112; 714/47
(58) Field of Search ........................... 710/8–10, 33–35, 710/52–61; 711/112–113; 714/47–48; 360/445, 60, 75; 369/84, 53, 36

(56) References Cited

U.S. PATENT DOCUMENTS

| | | | | |
|---|---|---|---|---|
| 4,860,193 A | * | 8/1989 | Bentley et al. ................. 710/55 |
| 5,412,809 A | * | 5/1995 | Tam et al. .................... 713/324 |
| 5,479,611 A | * | 12/1995 | Oyama ......................... 714/48 |
| 5,710,943 A | * | 1/1998 | Burton et al. .................. 710/52 |
| 5,765,189 A | | 6/1998 | Treiber et al. ................. 711/117 |
| 5,778,420 A | * | 7/1998 | Shitara et al. ................ 711/113 |
| 5,860,089 A | * | 1/1999 | Ishii ............................ 711/112 |
| 5,864,568 A | | 1/1999 | Nemazie ................... 371/40.14 |
| 5,890,210 A | * | 3/1999 | Ishii et al. .................... 711/113 |
| 6,189,080 B1 | * | 2/2001 | Ofer ............................ 711/167 |
| 6,195,663 B1 | * | 2/2001 | Cheng ....................... 707/104.1 |
| 6,223,235 B1 | * | 4/2001 | Cheng ......................... 710/107 |
| 6,343,324 B1 | * | 1/2002 | Hubis et al. ................... 709/229 |
| 6,393,561 B1 | * | 5/2002 | Hagiwara et al. ............ 713/100 |
| 2002/0010833 A1 | * | 1/2002 | Yoshihiro ..................... 711/112 |

* cited by examiner

*Primary Examiner*—Christopher B. Shin
(74) *Attorney, Agent, or Firm*—Woodcock Washburn LLP

(57) ABSTRACT

A disk drive that sustains a constant rate to a host and provides a method for allowing retries and accesses to reallocated sectors if the disk drive's recent historical performance has been sufficient to guarantee that the minimum transfer rate will be met while performing a retry or accessing a reallocated sector. During the transfer of data, the disk drive determines a reserve value that represents the amount of data that is stored in a transfer buffer. The reserve value is increased by the number of sectors actually sent to an intermediate buffer between the disk drive and the host, and decreased based on the minimum or constant data rate, normalized to revolutions of a disk within the drive. Based on this value, the disk drive determines if the disk drive can seek for data in reallocated sectors or to perform retries to correct faulty data while maintaining the minimum transfer rate. Because disk drive electronics provide automation for the transfer portion, the process of performing retries and seeks may be programed in the hardware such that specific conditions may be set under which the disk drive may stop and perform a retry or seek to a reallocated sector location.

16 Claims, 4 Drawing Sheets

METHOD AND APPARATUS OF SUSTAINED SEQUENTIAL DATA TRANSFER IN A MEDIA DRIVE

FIELD OF THE INVENTION

The present invention relates to data transfer from a disk drive. More particularly, the present invention relates to a sequential data transfer control and correction mechanism in a disk drive for use in transferring large files at a constant data rate.

BACKGROUND OF THE INVENTION

In Audio/Video (AV) applications, it is essential that a source of the audio or video data (e.g., a local disk drive, network server, etc.) maintain a constant data rate to the host to ensure acceptable picture and sound quality. The host may be, for example, a personal computer. Typically, when the source is a local disk drive within the personal computer, there are settings in the drive to ignore errors during a transfer in order to maintain the minimum flow of streaming data. Data read errors are handled by re-reading the data by a mechanism called a "retry." Each retry to re-read data takes at least one disk revolution. If the disk drive is set to ignore errors, faulty data may be sent to the host. Because the faulty data is part of a video or audio stream, the viewer is typically subjected to a very short burst of "noise" and/or loss of picture until good data is again received by the host. Such noise is distracting and detracts from the viewer's enjoyment of the audio and video program.

With the advances in disk drive technology, including faster transfer rates and greater capacity, more and more audio and video data is being stored on disk drives. Accordingly, there is a need for a disk drive that will maintain a constant data rate, while minimizing the amount of faulty data that is transferred to the host. The present invention provides such a solution.

SUMMARY OF THE INVENTION

The present invention is directed to a sequential data transfer control mechanism for use in a media drive, such that a minimum or constant data rate to a host is sustained while providing a method for allowing retries and accesses to reallocated sectors if the disk drive's recent historical performance has been sufficient to guarantee that the minimum or constant data rate will be met while performing a retry or accessing a reallocated sector. During the transfer of data, the disk drive determines a reserve value that represents the amount of data that is stored in a transfer buffer. The reserve value is increased by the number of sector of data actually sent to an intermediate buffer between the disk drive and the host, and decreased based on the minimum or constant data rate, normalized to revolutions of a disk within the drive. Based on this value, it is determined if the disk drive can seek for data in reallocated sectors or perform retries to correct faulty data when errors occur. Because disk drive electronics provide automation for the transfer portion, the process of performing retries and seeks may be programed into the disk drive hardware such that specific conditions may be set under which the disk drive may stop transferring data and perform a retry or seek to a reallocated sector location. When particular error conditions are encountered, and the reserve value exceeds the minimum or constant data rate, there is enough data in the buffer to perform a retry. Also, when other error conditions are encountered and the reserve value exceeds a higher threshold (e.g., approximately 4 times the constant data rate), there is enough data in the buffer for the disk drive to seek to a reallocated sector's location on the disk, read it, and return to continue the transfer of data to the host.

Other features and aspects will be described herein.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings.

DETAILED DESCRIPTION OF THE PREFERRED EMBODIMENTS

Figure 1:
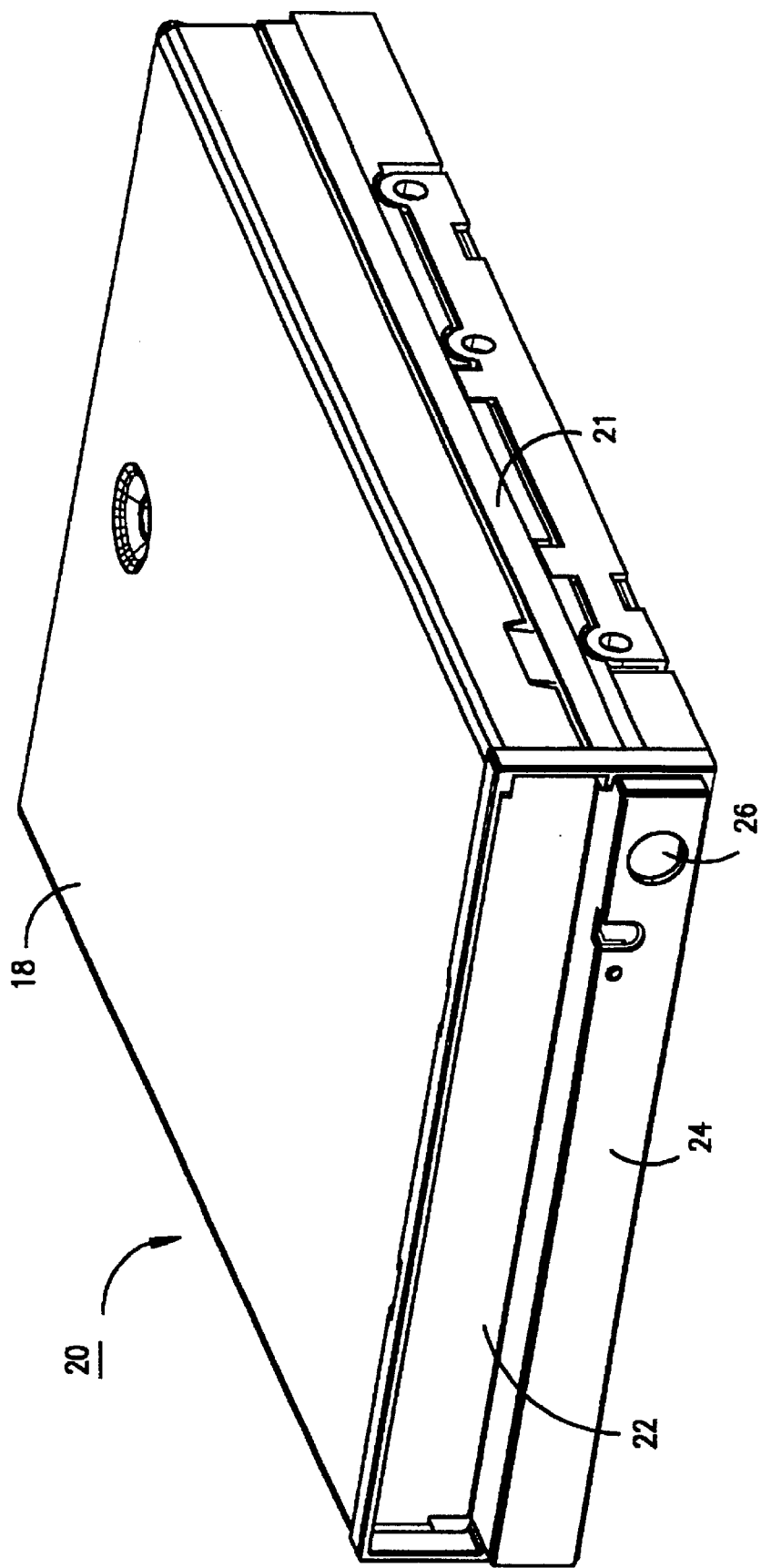
FIG. 1 is a perspective view of a disk drive in accordance with the present invention.

Referring to the drawings wherein like numerals indicate like elements throughout, FIG. 1 illustrates a disk drive 20 for receiving a disk cartridge (not shown). The disk drive 20 preferably comprises, a JAZ® drive, manufactured by lomega Corporation, Roy, Utah; however, other disk drives (i.e., hard disk, floppy disk, or optical) may be used as disk drive 20. The disk drive 20 comprises an outer housing 18 that is attached to a rigid chassis 21. A front panel 24 is attached to a forward end of the chassis 21. The disk cartridge is inserted into the disk drive 20 through an elongate, horizontal opening 22 in the front panel 24. An eject button 26 is provided on the front panel 24 for automatically ejecting a disk cartridge from the disk drive 20, as described hereinafter. In the embodiment shown, the disk drive 20 is configured for insertion into the housing of a computer system, such as a personal computer. However, the disk drive 20 can also be employed as a stand-alone unit. Preferably, the front panel 24 is formed of plastic, and the housing 18 and drive chassis 21 are formed of metal, although other suitable materials may be employed.

Figure 2:
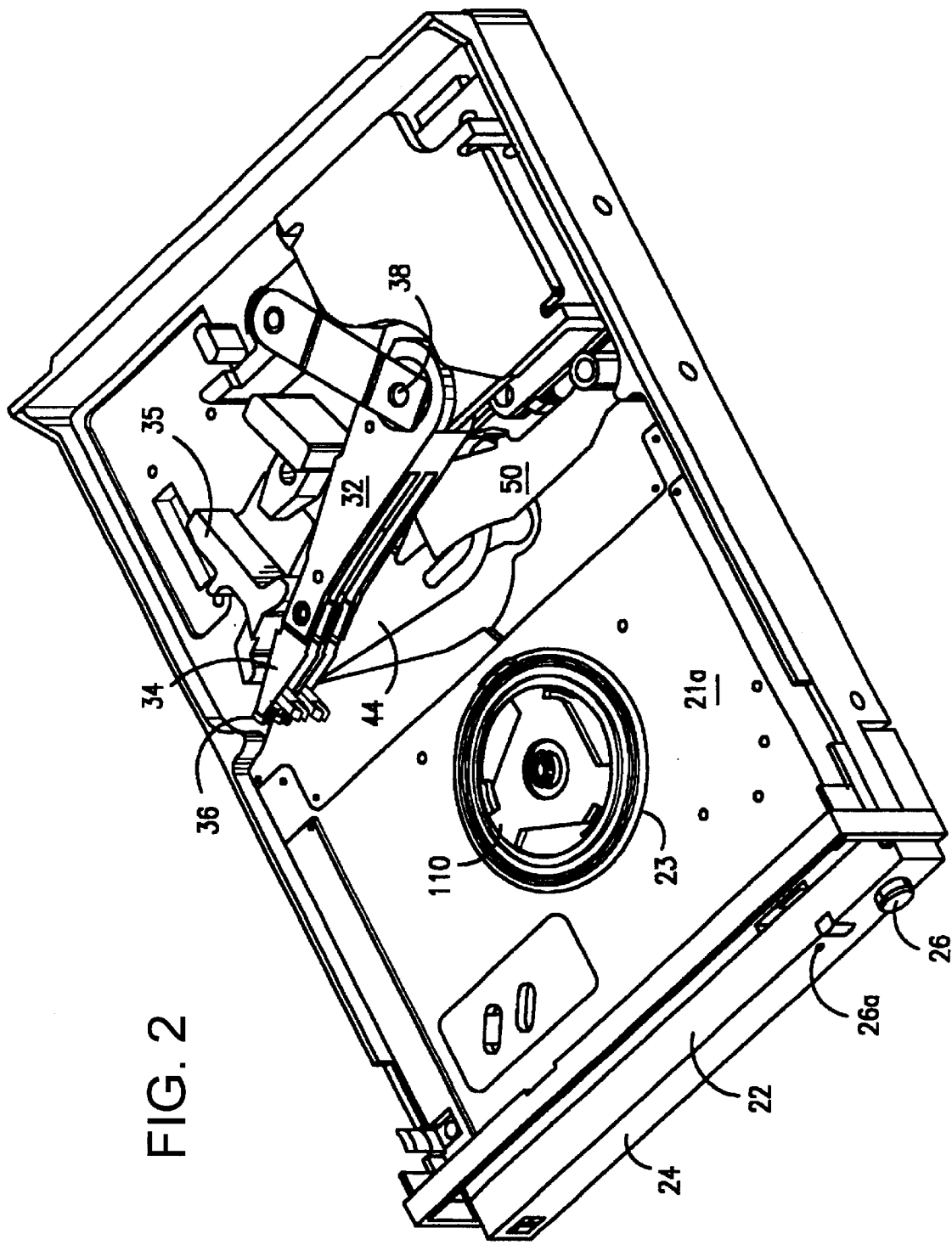
FIG. 2 is a perspective view of the disk drive of FIG. 1 with its outer housing removed to expose the drive chassis and various components mounted thereon.

FIG. 2 is a perspective view of the disk drive 20 of FIG. 1 with the housing 18 removed. As shown, a number of components are mounted on the upper surface 21a of the drive chassis 21. For example, an actuator arm 32, which forms part of a radial arm voice coil actuator, is pivotally mounted to the drive chassis 21 at 38. The actuator arm 32 has a plurality of suspension arms 34 at its distal end that each carry a read/write head 36 for recording and reading information to and from respective surfaces of the recording disks of the disk cartridge. A voice coil element 42 is affixed to the other end of the actuator arm 32 for controlling the rotational movement of the arm 32. A head loading mechanism 35 facilitates loading of the magnetic heads onto the disk surfaces.

As further shown, a head park lever 44 and a cartridge eject lever 50 are each pivotally mounted to the drive chassis. The operation of these levers 44, 50 is described hereinafter. As also described hereinafter, a spindle motor 110 and its housing 112 are mounted in a motor ring (not shown) on the underside of the drive chassis 21. The motor ring operates to translate the spindle motor vertically through an opening 23 in the drive chassis 21 in order to engage the hub 16 of the disk cartridge 10.

Figure 3:
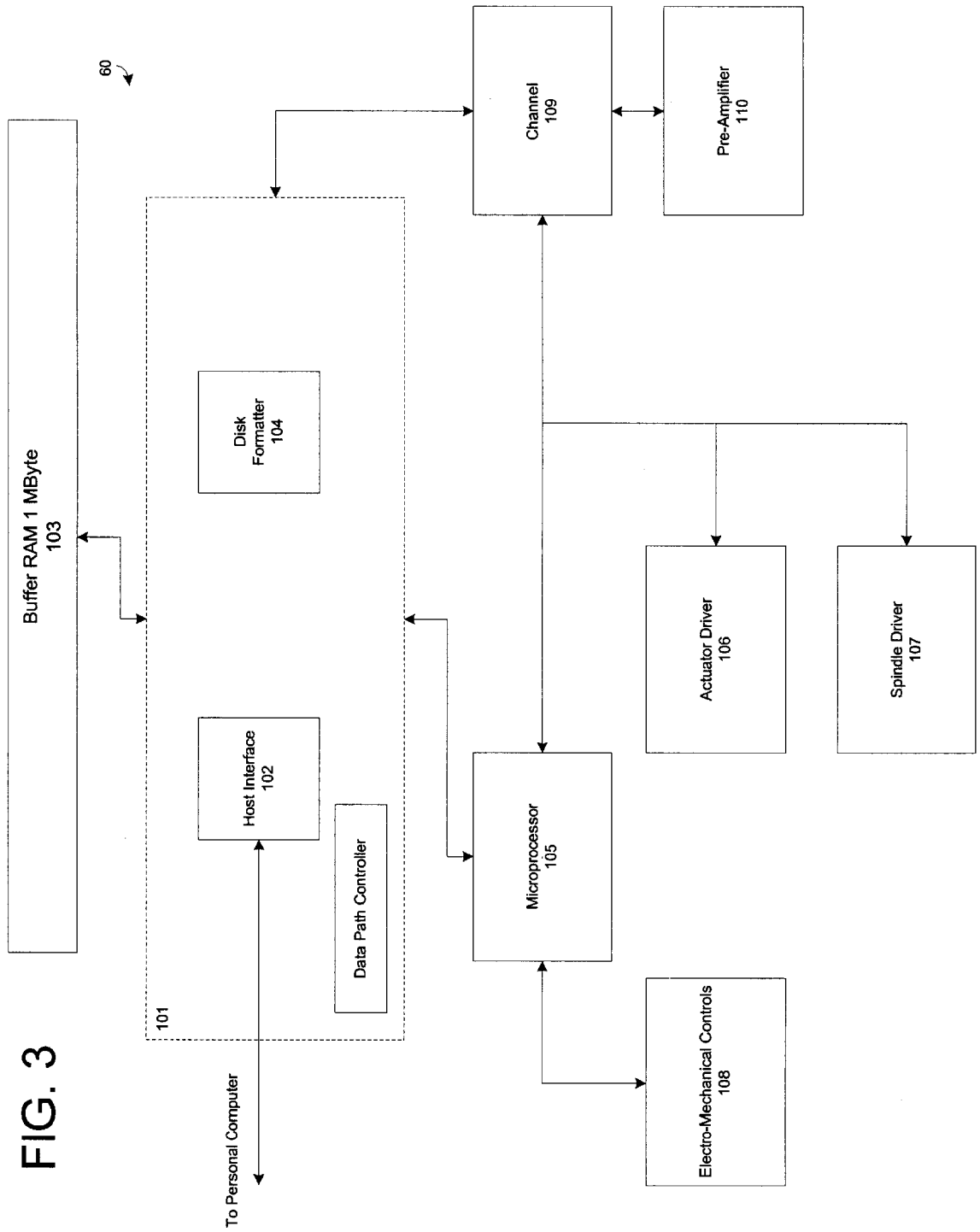
FIG. 3 is a block diagram of the exemplary control components within the disk drive of FIGS. 1 and 2.

Referring now to FIG. 3, there is illustrated a block diagram of exemplary control components 60 that control the operation of the disk drive 20. In the exemplary diagram of FIG. 3, the components 60 provide an interface to a personal computer (not shown). The disk drive 20 includes components that provide for communication between the read/write channel for the media (lower right side of diagram) and the personal computer (upper left side of diagram). The disk drive 20 includes a data path controller 101 that performs interface 102 and disk formatter 104 functions. The interface 101 communicates to a 1 MByte buffer RAM 103, which is provided to temporarily store data transferred to and from the personal computer. Also provided within the disk drive 20 is a microprocessor 105, actuator driver 106, spindle driver 107, electromechanical controls 108, a channel 109 and a pre-amplifier 110, which control the various mechanical and electrical components described with reference to FIGS. 1 and 2. The microprocessor 105 may perform such functions as servo sequencing, data splitting, EOC, ENDEC, and A/D and D/A conversion. The communication between the disk drive 20 and the personal computer is accomplished through transfers of data between the input/output channel of the disk drive 20 and the data path controller 101 of the personal computer. The data path controller 101 is responsible for determining how the disk drive 20 will handle errors under stop conditions.

As noted above, a problem in the prior art is that faulty data is transferred to the host when the disk drive 20 is set to ignore all errors. However, the disk drive 20 is typically transferring data at a rate far in excess of the throughput required by the application. The present invention takes advantage of the higher disk transfer rate of the disk drive 20 by providing a method to allow retries and time-consuming accesses to reallocated sectors if the disk drive's 20 recent historical performance has been sufficient to guarantee that the constant data rate will be met while performing a retry or accessing a reallocated sector. The present invention advantageously will allow the drive to provide the best data to the host, while minimizing and perhaps eliminating any of the noise spikes and picture drop-outs experienced by the viewer.

Figure 4:
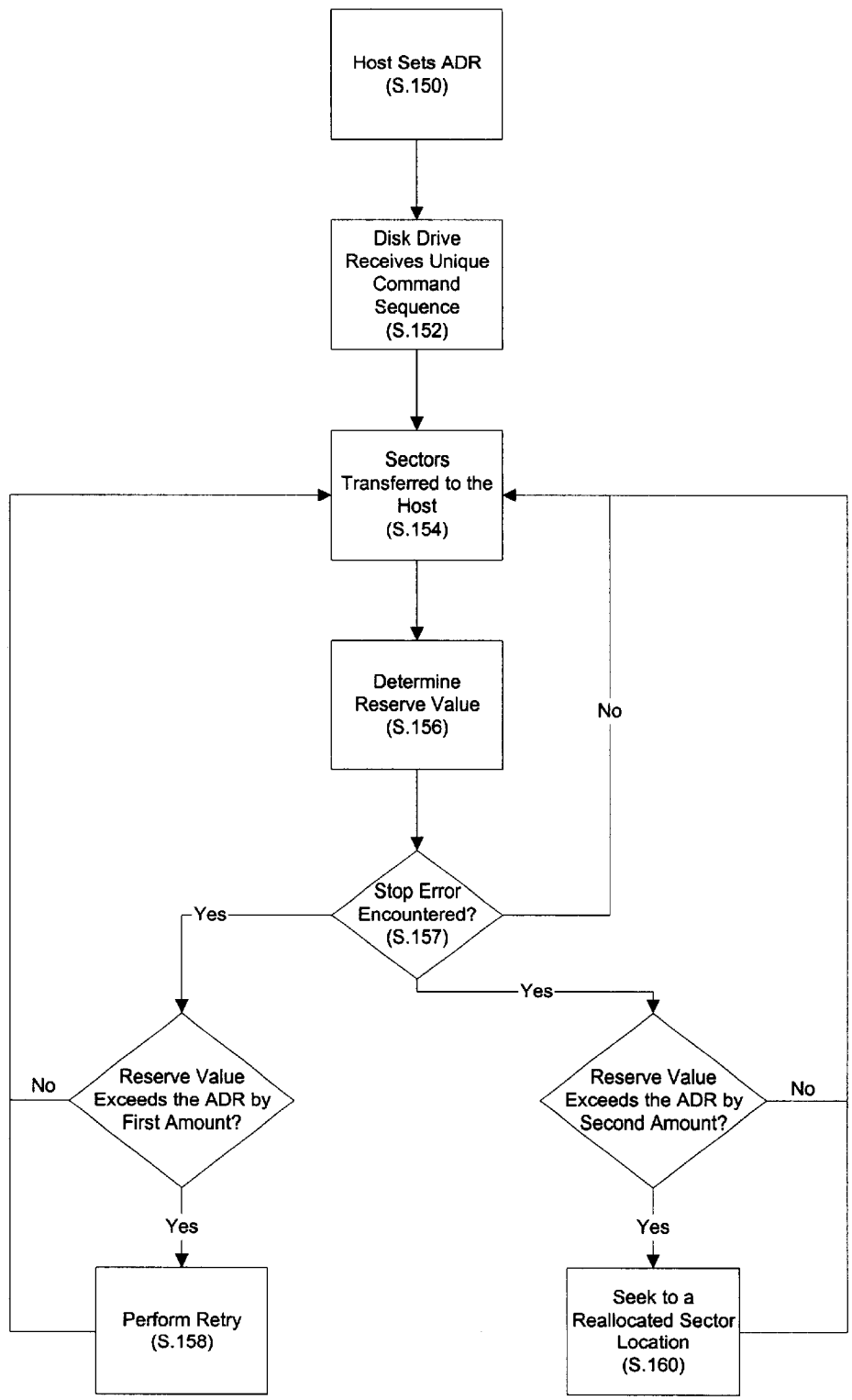
FIG. 4. is a flow chart of the processes performed by the present invention.

Turning now to FIG. 4, there is illustrated the process by which the present invention provides for sequential data transfer. First, the host sets a desired rate of sector flow per revolution (S.150). This desired rate is a constant data rate, and will be referred to herein as the Application Data Rate (ADR). The ADR is sent to the disk drive 20 components 60 via a vendor unique command sequence (S.152).

In accordance with the present invention, the disk drive 20 maintains a reserve value that represents the amount of data that is stored in a transfer buffer, which is used to determine if the disk drive 20 can look for data in reallocated sectors or to perform retries to correct faulty data. The reserve value is determined as the difference between the actual performance (i.e., the disk drive transfer rate) and the host requirements as determined by the ADR.

As sectors data are transferred to the host (S.154), the reserve value is periodically determined by increasing the value by the number of sectors actually sent and decreased by the value based on the host ADR, normalized to revolutions (S.156). Thus, if the disk drive 20 is transferring data to the host at a rate greater than the ADR, which is often the case, the reserve value will continually increase.

Because the disk drive electronics 60 provide automation for the transfer portion, the above-process may be programed in the hardware such that specific conditions may be set under which the disk drive 20 may stop and perform a retry or seek to a reallocated sector location (S.157). For example, the disk drive 20 could be programmed to stop on an Error Correcting Code (ECC) error. Thus, when starting a new transfer of a set of sectors of data from the disk to the buffer, the reserve value will be used to additionally determine how stop conditions for the electronics hardware are handled. When certain types of stop conditions are encountered (e.g., ECC errors) and the reserve value exceeds the ADR, there is enough data in the buffer to perform a retry (S.158). If not the reserve value does not exceed the ADR, the process returns to step S.154 to transfer additional data to the host. When other types of stop conditions are encountered (e.g., bad sector) and the reserve value exceeds a higher threshold (e.g., approximately 4 times ADR), there is enough data in the buffer for the disk drive 20 to seek to a reallocated sector's location on the disk, read it, and return to continue the transfer to the host (S.160). If not the reserve value does not exceed the ADR by the higher threshold, the process returns to step S.154 to transfer additional data to the host. It is noted that handling of reallocated sectors depends somewhat on the actual implementation of defect management within the disk drive 20.

Below is exemplary C-type psuedo-code illustrating the "Gas Tank" implementation of the present invention when the disk drive 20 is in the AV mode of operation. Alternate approaches are possible.

```
*/
int ADR; int GasTank;                      /* Application Data Rate (sectors per rev.) */
set_ADR(int value)                         /* Command from host */
{
        ADR = value;                       /* sectors per rev */
        return:
}
update_gasTank(int revs-passed, sectors_xferred)
/* revs-passed = number of revolutions since last update */
/* sectors_xferred = number of sectors sent to the host since last update */
(
        GasTank += sectors_xferred;
        GasTank -= ADR * revs-passed;
        if(GasTank < 0) GasTank = 0;       /* "clamp" at zero. negative means nothing */
```

```
)
start_transfer_for_host(int location)          /* start or re-start */
{
        int halt-mode = do_not_stop_till_done;
        if(location != sequential_xfer( )) GasTank = 0;
        /* allow for retry */
        if(GasTank > ADR) halt-mode = allow_error_stop;
        /* allow for time to read/write an alternate sector */
        if(GasTank > 4*ADR)              /* assumes 4 revolutions to access a reallocation */
        halt-mode = halt-mode PLUS allow_realloc_fetch;
        start_hardware(halt_mode);
}
do-retry( )                              /* assumes one revolution */
{
        int success:
        GasTank -= ADR;
        if(retry_count == 0) return;
        retry-count = retry-count - 1;
        successful = disk_retry( );
        If (NOT successful AND GasTank > ADR) do_retry( );
}
```

Thus, the present invention provides for a simple, yet unique method by which errors may be corrected in a disk drive that provides a constant data rate to an application. Further, the present application may be used to provide a constant data rate to an application, even if the source is providing variable rate data.

The present invention may be employed in other specific forms without departing from the spirit or essential attributes thereof. While the invention has been described and illustrated with reference to specific embodiments, those skilled in the art will recognize that modification and variations may be made without departing from the principles of the invention as described herein above and set forth in the following claims.

What is claimed:

1. A method of providing data to a host, said data being transferred from a data source at a transfer rate to an intermediate buffer, said method comprising:

setting an application data rate which specifies a minimum data rate at which said data is to be transferred to said host from said intermediate buffer;

determining a reserve value based on said application data rate and said transfer rate;

determining if an error condition has occurred in the transfer of said data from said source; and performing one of a retry or seek to a reallocated sector location based on said reserve value.

2. The method as recited in claim 1, wherein said determining said reserve value based on said application data rate and said transfer rate comprises:

increasing said reserve value by an amount of data transferred from said source; and decreasing said reserve value based on said application data rate.

3. The method as recited in claim 2, wherein said data is transferred from a disk drive, wherein said amount of data transferred from said data source is a number of sectors of data sent to said buffet, and wherein said reserve value is decreased based on said application data rate being normalized to revolutions of a disk within said disk drive.

4. The method as recited in claim 3, further comprising sending said application data rate to said disk drive via a vendor unique command sequence.

5. The method as recited in claim 1, wherein said error condition comprises stop errors.

6. The method as recited in claim 1, wherein said error condition comprises a plurality of types of error conditions, and wherein if a first type of said error condition has occurred and said reserve value exceeds said application data rate by a first predetermined amount, said retry is performed.

7. The method as recited in claim 6, wherein if a second type of said error condition has occurred and said reserve value exceeds said application data rate by a second predetermined amount, said seek to a reallocated sector location is performed.

8. The method as recited in claim 7, wherein said first predetermined amount is one times said application data rate, and said second predetermined amount is approximately four times said application data rate.

9. A disk drive for supplying streaming data to a host, comprising:

an actuator arm having a plurality of suspension arms each carrying a read/write head;

a buffer which receives data, read by said read/write head, that is to be transferred to said host; and a controller that manages communication of said data between said buffer and said host, wherein said disk drive transfers said data at a transfer rate to said buffer, and wherein said host sets an application data rate which specifies a minimum data rate at which said data is to be transferred to said host from said buffer via a vendor unique command sequence.

10. The disk drive as recited in claim 9, wherein said controller determines a reserve value based on said application data rate and said transfer rate.

11. The disk drive as recited in claim 10, wherein said controller determines if an error condition has occurred in the transmission of said data and instructs said disk drive to perform one of a retry or seek to a reallocated sector location based on said reserve value.

12. The disk drive as recited in claim 11, wherein said reserve value is determined by said controller by increasing said reserve value by a number of sectors sent to said buffer, and decreasing said reserve value based on said application data rate.

13. The disk drive as recited in claim 12, wherein said reserve value is decreased based on said application data rate begin normalized to revolutions of a disk within said disk drive.

14. The disk drive as recited in claim 11, wherein said error condition comprise a plurality of types of error conditions, and wherein if a first type of said error condition has occurred and said reserve value exceeds said application data rate by a first predetermined amount, said retry is performed.

15. The disk drive as recited in claim 14, wherein if a second type of said error condition has occurred and said reserve value exceeds said application data rate by a second predetermined amount, said seek to a reallocated sector location is performed.

16. The disk drive as recited in claim 15, wherein said first predetermined amount is one times said application data rate, and said second predetermined amount is approximately four times said application data rate.

* * * * *